(12) United States Patent
Pawl et al.

(10) Patent No.: US 10,298,588 B2
(45) Date of Patent: May 21, 2019

(54) SECURE COMMUNICATION SYSTEM AND METHOD

(71) Applicant: BlackSands, Inc., Northville, MI (US)

(72) Inventors: Dan T. Pawl, Saranac, MI (US); Nathan J. Pawl, Walled Lake, MI (US); Timothy F. Gallagher, Canton, MI (US)

(73) Assignee: BlackSands, Inc., Northville, MI (US)

( * ) Notice: Subject to any disclaimer, the term of this patent is extended or adjusted under 35 U.S.C. 154(b) by 171 days.

(21) Appl. No.: 15/320,479

(22) PCT Filed: Jul. 29, 2015

(86) PCT No.: PCT/US2015/042655
§ 371 (c)(1),
(2) Date: Dec. 20, 2016

(87) PCT Pub. No.: WO2016/019016
PCT Pub. Date: Feb. 4, 2016

(65) Prior Publication Data
US 2017/0230374 A1    Aug. 10, 2017

Related U.S. Application Data

(60) Provisional application No. 62/030,137, filed on Jul. 29, 2014.

(51) Int. Cl.
*H04L 29/06* (2006.01)
*G06F 21/31* (2013.01)
(Continued)

(52) U.S. Cl.
CPC .......... *H04L 63/101* (2013.01); *G06F 21/316* (2013.01); *G06F 21/44* (2013.01); *G06F 21/629* (2013.01); *H04L 12/40117* (2013.01)

(58) Field of Classification Search
CPC ... H04L 63/101; H04L 12/40117; G06F 21/44
See application file for complete search history.

(56) References Cited

U.S. PATENT DOCUMENTS

| | | | |
|---|---|---|---|
| 2002/0046353 A1* | 4/2002 | Kishimoto | .......... H04L 63/0442 726/28 |
| 2003/0061317 A1* | 3/2003 | Brown | .............. G06F 17/30905 709/221 |

(Continued)

OTHER PUBLICATIONS

Nandhakumar et al., Non Repudiation for Internet Access by Using Browser Based User Authentication Mechanism, Aug. 2013, Third International Conference on Advances in Computing and Communications, pp. 296-299 (Year: 2013).*

(Continued)

*Primary Examiner* — Kenneth W Chang
(74) *Attorney, Agent, or Firm* — Gardner, Linn, Burkhart & Ondersma LLP

(57) ABSTRACT

A secure communication system comprises a software program client operating on a host computing device, a service manager configured to manage client access to the protected services, an authorizer in communication between the client and the service manager, and a receiver in communication with the service manager and serves as an interface to the protected services. At least one of a browser and an application of the client is configured to access one or more protected services running on a computing device that is remote to the host computing device over a communication channel. The service manager maintains a list of predetermined services authorized for the client and limits client access to the predetermined services.

30 Claims, 11 Drawing Sheets

(51) Int. Cl.
*G06F 21/62* (2013.01)
*G06F 21/44* (2013.01)
*H04L 12/40* (2006.01)

(56) References Cited

U.S. PATENT DOCUMENTS

| | | |
|---|---|---|
| 2003/0084350 A1* | 5/2003 | Eibach .................. H04L 63/08 726/4 |
| 2006/0253901 A1 | 11/2006 | Roddy et al. |
| 2007/0050635 A1* | 3/2007 | Popp .................... H04L 9/0863 713/185 |
| 2007/0124802 A1 | 5/2007 | Anton, Jr. et al. |
| 2008/0037793 A1 | 2/2008 | Buer |
| 2008/0177997 A1 | 7/2008 | Morais et al. |
| 2008/0209224 A1* | 8/2008 | Lord .................... H04L 63/083 713/185 |
| 2011/0023103 A1* | 1/2011 | Dietrich ................ G06F 21/31 726/9 |
| 2011/0153779 A1 | 6/2011 | Mendez et al. |
| 2012/0008786 A1 | 1/2012 | Cronk et al. |
| 2012/0321058 A1 | 12/2012 | Eng et al. |
| 2014/0173282 A1 | 6/2014 | Pascariello et al. |
| 2014/0173283 A1 | 6/2014 | Hanatani et al. |

OTHER PUBLICATIONS

International Preliminary Report on Patentability from corresponding Patent Cooperation Treaty Patent Application No. PCT/US2015/042655 dated Feb. 9, 2017.

International Search Report and Written Opinion of the International Searching Authority from corresponding Patent Cooperation Treaty (PCT) Patent Application No. PCT/US15/42655, dated Oct. 16, 2015.

* cited by examiner

Internet Based Embodiment

Partially Isolated Embodiment
Buss Architecture

Partially Isolated Embodiment
Network Architecture

Fully Isolated Embodiment
Network Architecture

SECURE COMMUNICATION SYSTEM AND METHOD

CROSS-REFERENCE TO RELATED APPLICATION

This application claims the priority benefits of International Patent Application No. PCT/US2015/042655, filed on Jul. 29, 2015, which claims priority from U.S. patent application Ser. No. 62/030,137, filed on Jul. 29, 2014, the disclosures of which are hereby incorporated herein by reference.

FIELD OF THE INVENTION

The present invention relates generally to computer network security and, more specifically, to systems and methods for securing access to computer services.

BACKGROUND OF THE INVENTION

Most secure network connections take a "trust but verify" approach. Under this approach, a remote client has access to a targeted service. It is left to the service to grant or deny access to the requesting party. Filters are used to attempt to block malicious attempts at gaining access to the targeted service. When a malicious actor has been identified, the filters are updated to try to impede repeated malicious attempts by the same bad actor.

SUMMARY OF THE INVENTION

Embodiments of the present invention take a "Verify then Trust" approach. That is to say, verify who is attempting to access a service, where the access is originating, and limiting the attempted access to only services that the originating requestor has authority to access. This is done before the edge of the service is exposed to the requestor.

A secure communication system according to an aspect of the present invention includes a software program client, a service manager, an authorizer, and a receiver. The software program client, in conjunction with a browser or a web-based protocol application, operates on a host computing device. The client is configured to establish a secure session to one or more protected services running on one or more computing devices that are remote to the host computing device over a communication channel. The service manager is configured to manage access to the protected services by the client browser or application. The service manager maintains a list of predetermined services authorized for the client browser or application. The service manager in conjunction with the client, authorizer, and receiver limits the access of the client browser or application to the predetermined services. The authorizer is in communication between the client and the service manager. The authorizer is also operable to authenticate the client and, upon authentication, pass the predetermined services authorized for the client from the service manager to the client. The receiver is in communication with the service manager and serves as an interface to the protected services. The receiver ignores connection requests from all non-authenticated entities until a notification is received from the service manager authorizing the receiver to open a communication channel for the authorized client browser or application. Access of the client browser or application is limited to the predetermined services. The client browser or application also communicates with the predetermined services through the receiver.

According to an aspect of the present invention, an authorizer includes a communication device operable to send and receive messages over a network, and a processing device that is in digital communication with the communication device. The processing device is enabled to authenticate an access request to one or more protected services running on a remote computing device based on a user identity received through the communication device from a client operating on a remote host computing device. The user identity identifies the user requesting access to the protected services. The processing device receives a list of available services associated with the user identity from a service manager using the communication device. The service manager maintains a list of predetermined services authorized for the user identity. The processing device returns the list of predetermined services to the client using the communication device.

According to an aspect of the present invention, a service manager includes a communication device, a memory device, and a processing device. The communication device is operable to send and receive messages over a network. The memory device stores user identities and access rights to one or more protected services running on a remote computing device. The processing device is in digital communication with the communication device and the memory device. The processing device is enabled to retrieve from the memory device a list of protected services authorized for a remote client operating on a host computing system based on a user identity received through the communication device and return the list of the protected services associated with the user identity using the communication device. The processing device is further enabled to validate a request received through the communication device to access the protected services based on the access rights stored in the memory device and notify a receiver of the valid request. The receiver is in communication between the client browser or application and the protected services. The receiver ignores all attempts to communicate with the protected services until notified of the valid session request.

According to an aspect of the present invention, a receiver includes a communication device, a memory device, and a processing device. The communication device is operable to send and receive messages over a network. The processing device is in communication with the memory device and the communication device. The processing device is enabled to allow a communication session between a client browser or application operating on a host computing system and one or more protected services running on a remote computing device. The processing device ignores requests from all non-authenticated entities to access the protected services until the processing device receives an authorization from a service manager through the communication device. The client, authorizer, service manager, and receiver are configured to manage access to the protected services. The communication session between the client browser or application and the protected services is through the receiver.

The client of the secure communication system is configured to maintain a heartbeat connection with the authorizer. The authorizer may send a request to the service manager to have the receiver disconnect the communication channel with the client when the heartbeat is no longer present. A receiver may further contain a local bus hardware controller for communicating with the protected services.

In an Internet based version of the system, the authorizer, manager, and receiver may be operable in an Internet cloud, while the target services are operable at the target host site. In a partially isolated bus architecture version of the system, the authorizer and the manager may be operable in the Internet cloud. Another authorizer along with a receiver may be operable in the target local bus architecture. The target local bus architecture authorizer may allow for protected services within the local bus to communicate securely within the local bus architecture. In a partially isolated network architecture version of the system, the manager may be operable in the Internet cloud. The authorizers are operable within the Internet cloud and optionally within the target local network. An authorizer located within the protected services of the target local network can communicate between each protected service within the secure communications system. This version includes a switch or router within the target local network. The switch or router allows communication to pass through from the manager to the receiver or receivers. In addition, the switch or router allows communication from the Internet to pass to unprotected services. Multiple receivers within the target local network allow for fault protection and fully separated protected services, both internally within the target local network and from requests outside the target local network.

In a fully isolated network architecture aspect, the isolated network can be within an isolated network cloud or at a host site, or both. This embodiment allows for multiple combinations of routers and switches. It provides authorizers, managers, and receivers to be fully isolated from any traffic not part of the isolated network.

A method for securely accessing protected services running on a remote computing device, according to an aspect of the present invention, includes transmitting a user identity over a network from a client to an authorizer, service manager, and receiver for authentication. The authorizer is in communication with a service manager and the service manager is in communication with the receiver, all of which is configured to limit access to the protected services based on limitations established by an administrator of the protected services. The method further comprises waiting to receive an authentication response from the authorizer over said network. The authentication response includes a list of protected services authorized for the user identity. Access to one or more services from the list of protected services to the authorizer is passed over the network. The authorizer relays the request to the service manager. The request is verified by the service manager based on the list of protected services authorized for the user identity. A connection request is transmitted over the network to a receiver. The receiver is in communication with the protected services. The receiver is configured to ignore the connection request until the receiver receives a notification from the service manager that that request to access the protected services has been verified. The method further comprises waiting for the receiver to validate the connection request and open a communication channel. The method further comprises communicating with the service through the receiver over the communication channel.

The method of securely accessing protected services running on a remote computing device further comprises transmitting a heartbeat message to the authorizer over the network to keep the communication channel open.

A method of providing access to protected services running on a remote computing device, according to an aspect of the present invention, includes authenticating a client requesting access to the protected services based on a user identity received from the client, wherein the user identity identifies a host computing system running the client. A list of protected services authorized for the host computing system is retrieved based on the user identity. A communication channel is opened between the client browser or application and the protected services through a receiver. All communication between the client browser or application and the protected services is through the receiver. The access of the client browser or application to the protected services is limited to protected services authorized for the host computing system.

The method of providing access to protected services running on a remote server further comprises monitoring a heartbeat message received from the client and closing the communication channel if the heartbeat message is no longer received. The communication channel between the client and the receiver is secure.

These and other objects, advantages, purposes and features of the present invention will become more apparent upon review of the following specification in conjunction with the drawings.

DESCRIPTION OF THE PREFERRED EMBODIMENTS

Figure 1:
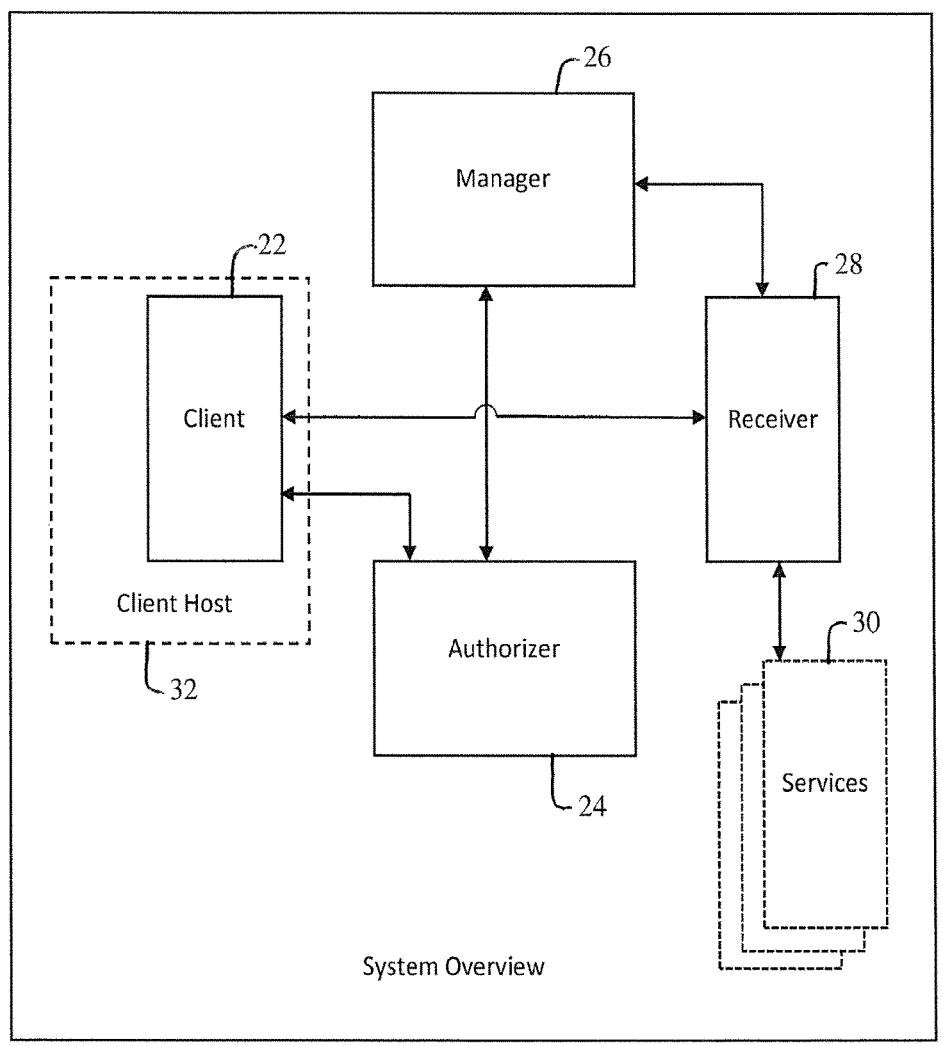
FIG. 1 is a block diagram of a secure communication system in accordance with the present invention.

The present invention will now be described with reference to the accompanying figures, wherein the numbered elements in the following written description correspond to like numbered elements in the figures. As illustrated in FIG. 1, a secure communication system 20 includes a client services unit or client 22, an authorizer 24, a service manager 26, and a receiver 28. Receiver 28 interfaces to one or more services 30 that require secured communication. As discussed in more detail below, when a user wishes to access one or more of the services 30, client 22 makes a request to authorizer 24 to authenticate the user based on a token containing an encrypted user identity. As further understood from FIG. 2, authorizer 24 authenticates the user and then communicates with service manager 26 to retrieve the available services associated with the user identity as predefined in service manager 26 by an administrator 34.

Authorizer 24 relays the available services from service manager 26 to client 22 while service manager 26 notifies receiver 28 of the session request from authorized client 22. Only after receiver 28 has validated the session request from service manager 26 is a secure communication session opened between receiver 28 and client 22. Client 22 may only access protected services 30 through receiver 28. The separation of powers approach utilized by secure communication system 20 prevents attempted access to service manager 26, receiver 28, and protected services 30 by non-authenticated users.

Figure 4:
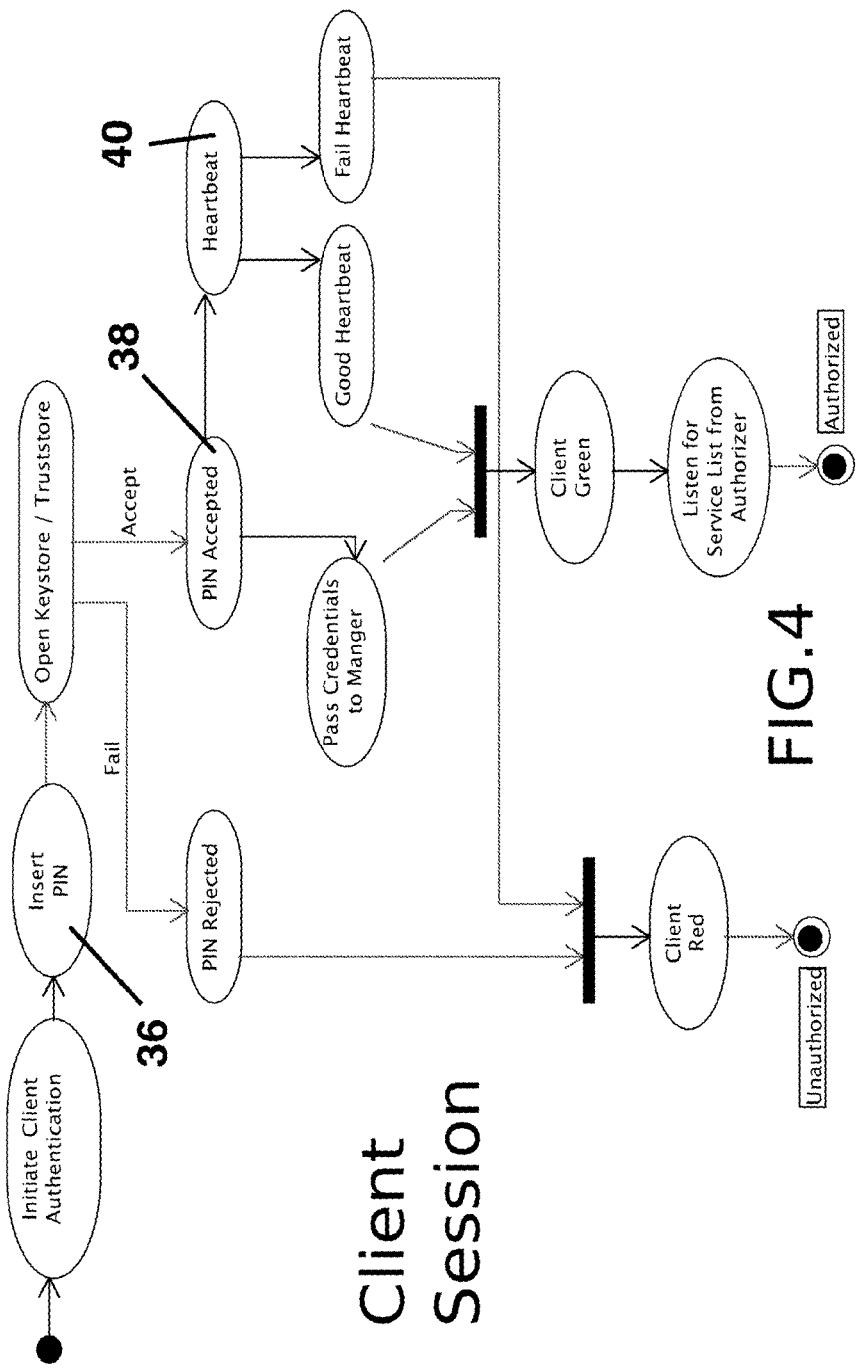
FIG. 4 is a flowchart illustrating operational features of the client.

Referring again to FIG. 1, client 22 is a computer software package that is loadable on a client host 32, such as a computer/controller, smart phone, tablet device or the like, to provide client services. Optionally, client 22 may integrate with other user software operating on host 32 or as part of the firmware of host 32. Client 22 may rely on host 32 for operating system functions, internet communication functions, and/or internet security functions. As shown in FIG. 4, client 22 performs a first stage of authentication by requesting a unique personal identifier or PIN (step 36). The PIN is never transmitted over the internet nor is it stored within client 22. Once client 22 has verified the PIN (step 38), client 22 communicates with authorizer 24 to request user authentication and access to one or more of the protected services 30 from service manager 26 as discussed below. If authenticated, client 22 establishes and manages a secure communication channel with receiver 28. Client 22 also includes functions to maintain a heartbeat (step 40) with authorizer 24 so that the secure channel is automatically disconnected when the heartbeat is no longer present.

Figure 5:
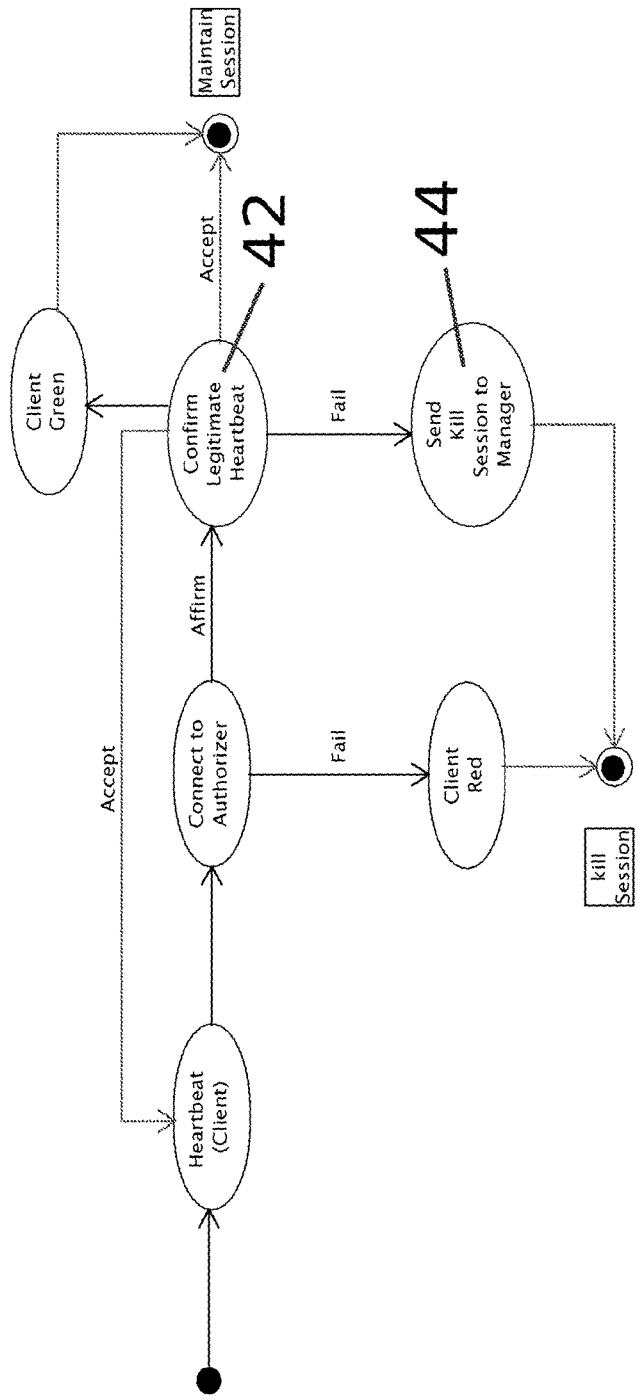
FIG. 5 is a flowchart illustrating the heartbeat function shared between the client and the authorizer.

Authorizer 24 is a hardware unit comprising a communication device and a processing device with embedded software to perform authorization and authentication functions in concert with client 22 and service manager 26. As shown in FIG. 1, authorizer 24 is in communication between client 22 and service manager 26. Authorizer 24 authenticates the user based on the user identity provided by client 22. Once authenticated, authorizer 24 is enabled to request the services available client 22 from service manager 26 based on the user identity and returns those services to client 22 as discussed in more detail below. Authorizer 24 may optionally be duplicated a number of times in system 20 to prevent denial of service attacks on a single authorizer 24. As shown in FIG. 5, authorizer 24 also manages a heartbeat with client 22 (step 42) and will send a request to service manager 26 to disconnect the secure channel between client 22 and receiver 28 (step 44) if client 22 fails to maintain the heartbeat.

Figure 2:
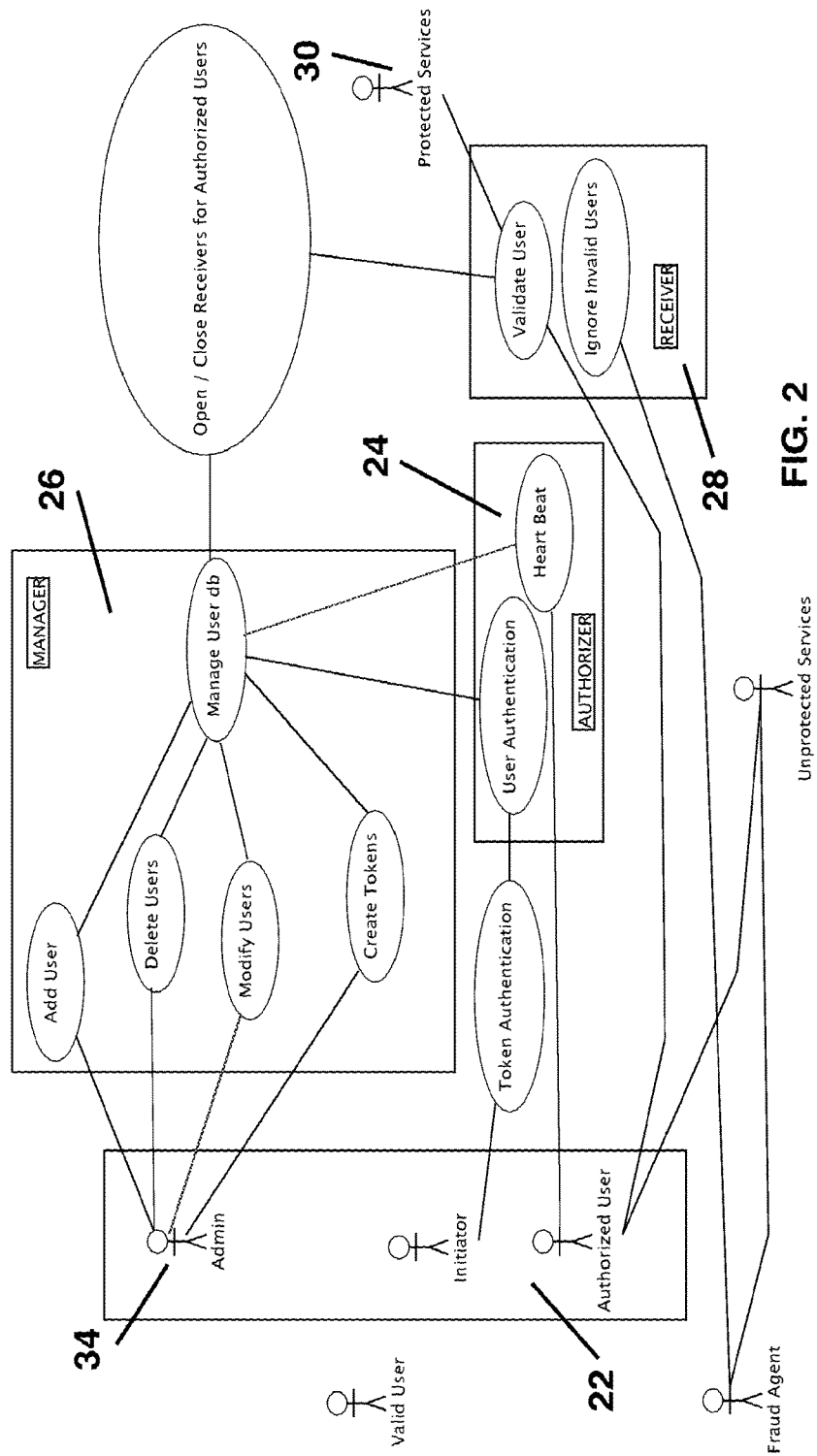
FIG. 2 is a schematic diagram illustrating a use case involving a secure communication system in accordance with the present invention.
Figure 6:
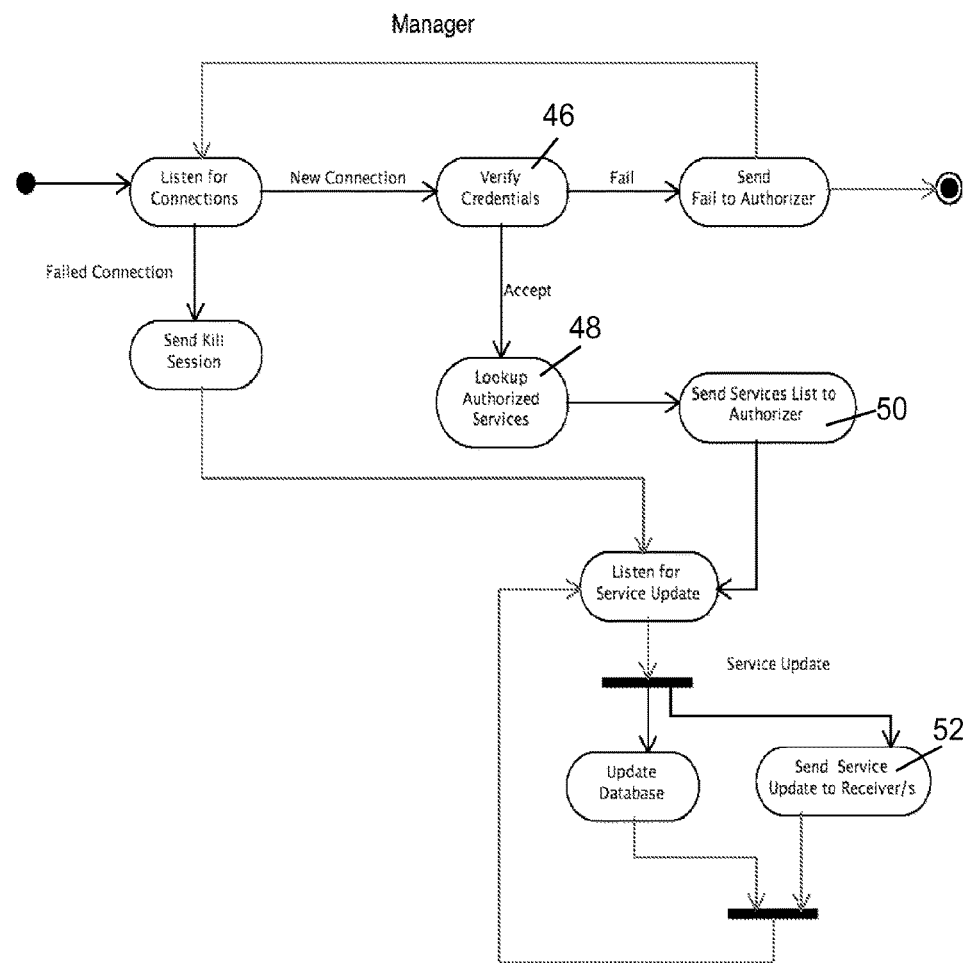
FIG. 6 is a flowchart illustrating operational features of the service manager.

As best described with reference to FIGS. 1 and 2, service manager 26 is a hardware unit comprising a communication device, a memory device, and a processing device having embedded software for managing access to services 30 by client 22. Service manager 26 maintains a list of predetermined services available for each user identity along with any regional limitations as established by administrator 34 in the memory device. Service manager 26 may also maintain a history of service connections to services 30. Referring now to FIG. 6, when authorizer 24 relays a request for a new connection from client 22, service manager 26 verifies the credentials of the user requesting the connection (step 46). If valid, service manager 26 retrieves the list of available services from the memory device based on the user identifier (step 48) and returns the list of services to authorizer 24 (step 50), which in turn returns the list to client 22. Service manager 26 also includes control software for communicating with receiver 28 to allow a connection with client 22 (step 52) as discussed in more detail below. Optionally, the functions of service manager 26 may be distributed over multiple hardware units to share loading and to provide redundancy.

Figure 7:
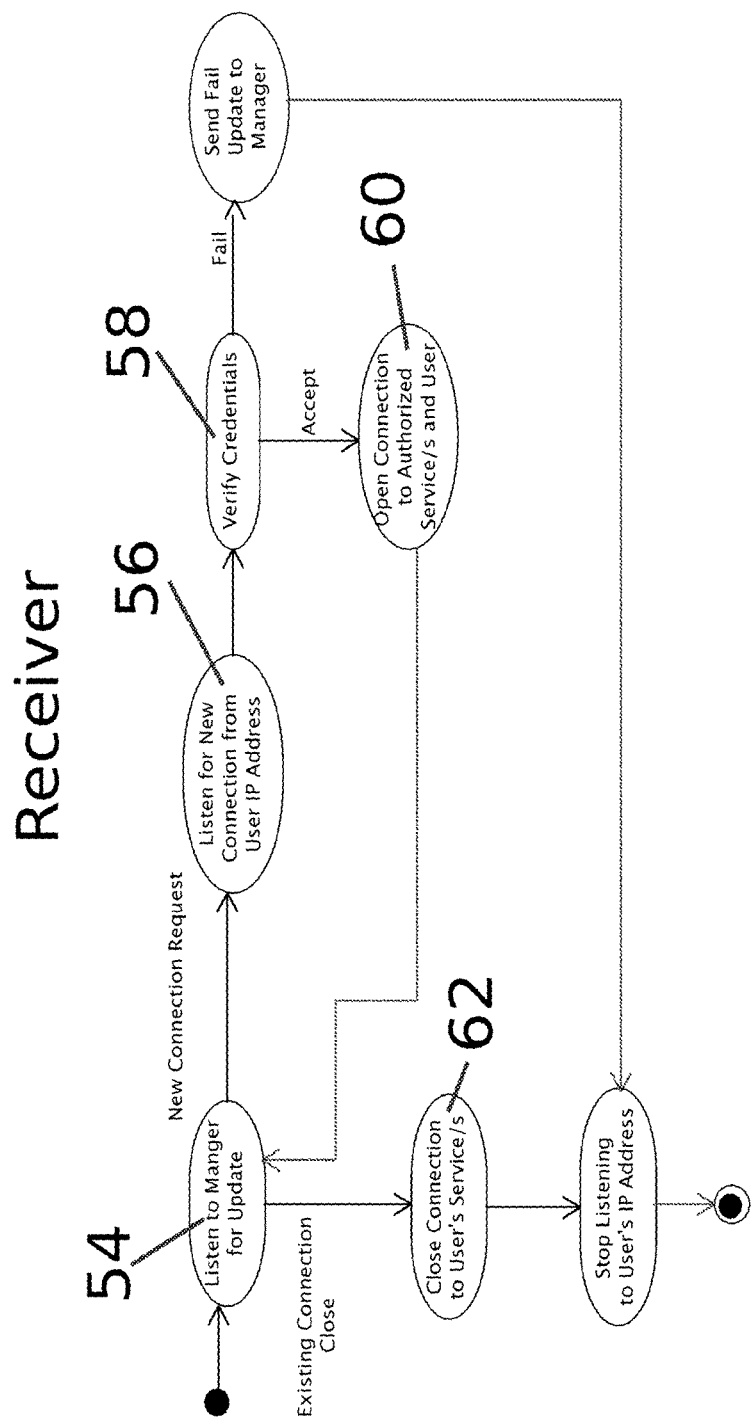
FIG. 7 is a flowchart illustrating operational features of the receiver.

Receiver 28 is a hardware unit comprising a communication device and a processing device with embedded software for managing communication sessions with protected services 30. As illustrated in FIG. 7, receiver 28 blocks or ignores all requesting packets until it receives a notification from service manager 26 to allow a secure communication session with a browser and/or application of client 22 (step 54). Upon receipt of notification from service manager 26, receiver 28 begins listening for a new connection request from the browser and/or application of client 22 (step 56). When receiver 28 receives the new connection request from the browser and/or application of client 22, it verifies the credentials of client 22 against the session credentials provided by service manager 26 (step 58) and, if legitimate, opens a secure connection to the services authorized for client 22 (step 60). All communication between the browser and/or application of client 22 and services 30 is through receiver 28. Upon session completion or termination, receiver 28 is configured to close all activities for the previously authorized session (step 62) and maintains a ready state in which it rejects all requests from unauthorized clients until it receives another notification from service manager 26 to allow a new session with another authorized client.

Figure 3:
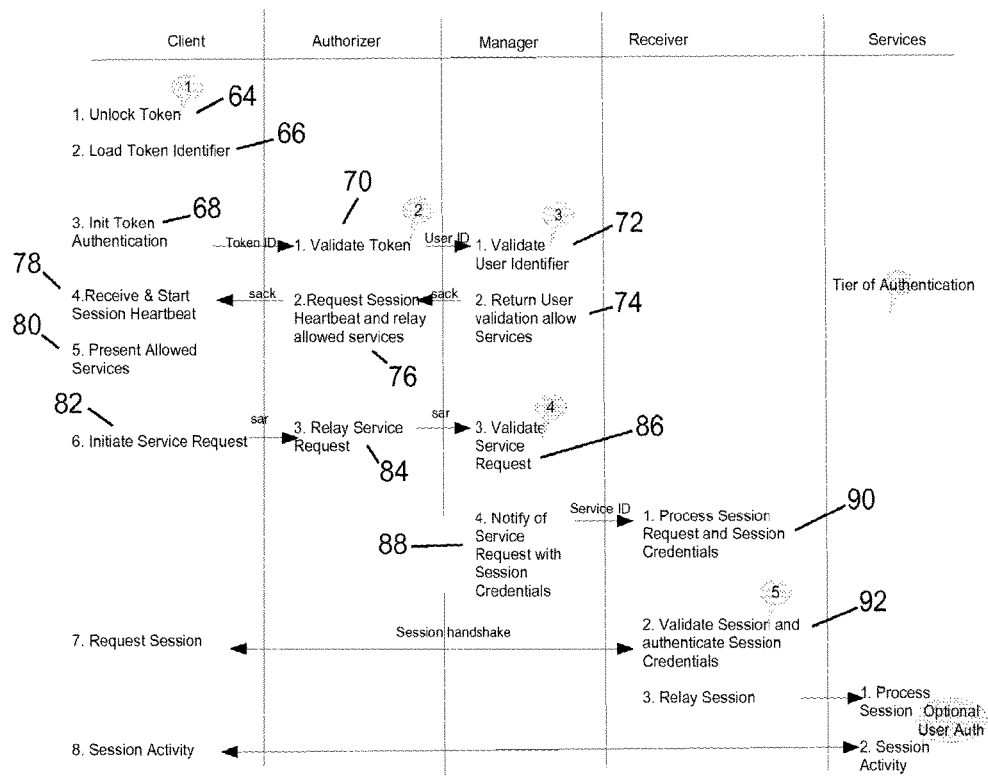
FIG. 3 is a state sequence chart illustrating the operation of the secure communication system of FIG. 1.

The secure communication process is shown in FIG. 3. The process originates in client 22 with the unlocking of a token (step 64). This is the first tier of authentication. As mentioned above, the token is unlocked using an alphanumeric sequence or PIN only valid to a unique user. Upon supplying the PIN, the client 22 unlocks or decrypts the token (step 66). The token contains an encrypted user identity, which is transmitted to authorizer 24 (step 68) for token validation (step 70). This is the second tier of authentication. Authorizer 24 then transmits the user identity to service manager 26 for user level authentication (step 72). Service manager 26 retrieves the user data and services authorized for client 22 and returns a service acknowledgement with available services to authorizer 24 (step 74). Authorizer 24 next relays the available services to client 22 and requests to start a heartbeat with client 22 as acknowledgment (step 76). Client 22 starts the heartbeat (step 78) and presents allowable session (step 80). Upon selecting the targeted session, client 22 issues a session or service access request to authorizer 24 (step 82), which in turn relays the request to service manager 26 (step 84). Service manager 26 verifies the session access request against the available services to validate that the request is authorized (step 86). This is the fourth tier of authorization provided by secure communication system 20. Next, service manager 26 notifies receiver 28 of the session request via a service identifier along with session credentials (step 88). Receiver 28 processes the session request along with the session credentials and, if valid, prepares for a valid session with the targeted service (steps 90 and 92). The targeted service can, at its option, use additional levels of user authentication as appropriate. At this point, five tiers of authorization have been passed and a session is available to the requested services. Steps 64 to 92 are all performed before any request is ever made to the targeted service.

It should be noted that if a request is denied or a failure occurs at any one of the five tiers of authorization, no not acknowledge message is returned. Intentionally, secure communication system 20 does not return a response to the request. This is a security feature to maintain darkness of the service against malicious probes. Secure communication system 20 is now ready for client host 32 to connect through the validated session to the targeted service. This can be accomplished through a traditional browser or, more directly, from a user's host software program through a variety of network protocols. The session remains open as long as there is activity or until client host 32 shuts down the session. After the session is closed, the entire secure communication process must be repeated in order to open another secure communication session. As noted above, all communication between client 22 and services 30 is through receiver 28. Client 22 never communicates directly with services 30.

Figure 8:
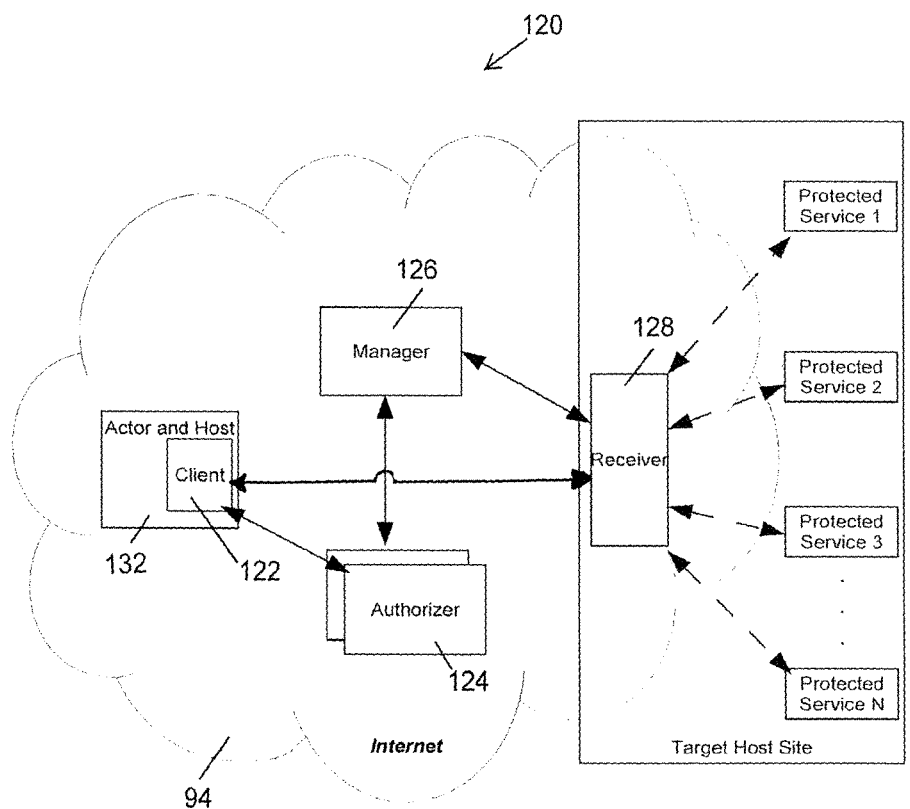
FIG. 8 is a block diagram illustrating an internet based embodiment of a secure communication system in accordance with the present invention.

FIG. 8 illustrates an internet-based secured communication system 120 using the secure communication process discussed above for secured communication system 20, such that a detailed discussion need not be repeated herein. Like components of secured communication system 120 are labeled with similar reference numerals, but with 100 added to the reference numerals of secured communication system 20. System 120 includes an actor host 132 with associated client 122, an authorizer 124, a service manager 126, and a receiver 128 all located in an internet 94. Internet 94 includes networks defined by Internet Standards from the Internet Engineering Task Force, cellular networks, wireless networks and the like. The secure communication processes is performed using standard internet secure protocols. Optionally, multiple authorizers 124 may be used to minimize the denial of service threat.

Figure 9:
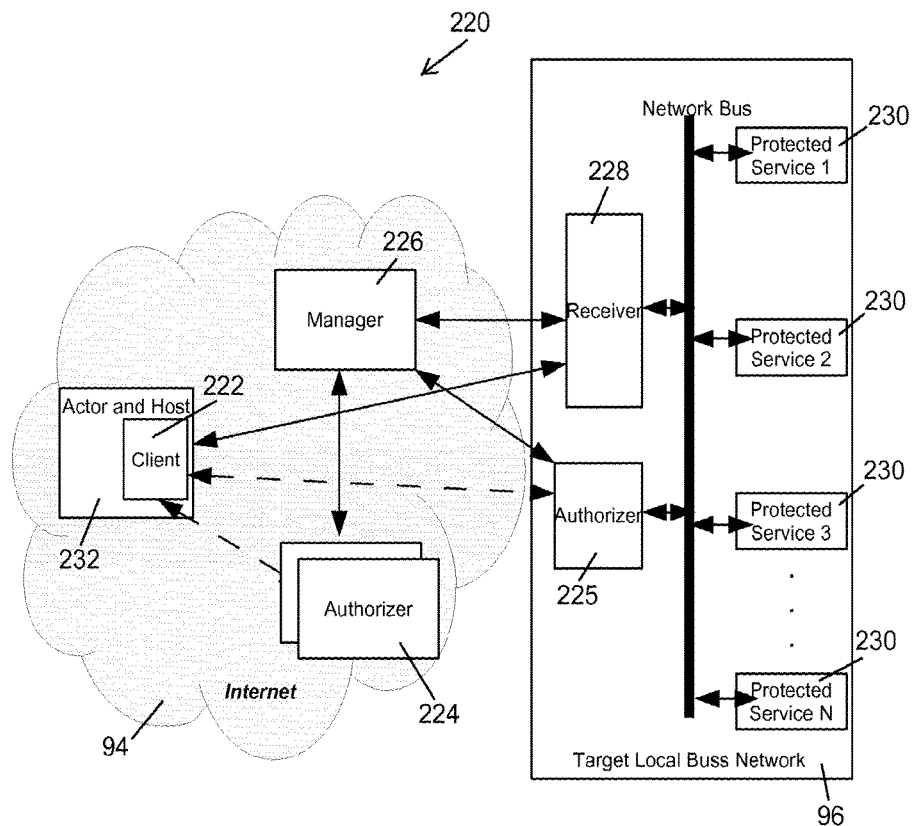
FIG. 9 is a block diagram illustrating an alternative embodiment of a secure communication system incorporating a target local bus network.

A partially isolated secured communication system 220 incorporating a targeted local bus network 96 is shown in FIG. 9. Secured communication system 220 uses the secure communication process discussed above with secured communication system 20. Like components of secured communication system 220 are labeled with similar reference numerals, but with 200 added to the reference numerals of secured communication system 20. Due to the similarities between system 20 and system 220, a detailed description need not be repeated herein.

System 220 includes an actor host 232 having an associated client 222, an authorizer 224, and a service manager 226 all located in the internet 94 similar to system 120 described above. However, unlike system 120, secure communication system 220 includes targeted local bus network 96, which uses a local bus and bus networking protocols for a more predictable high speed response and to separate internet traffic from bus traffic. A specific example of a local bus is a CAN bus, which is a message based protocol routinely used in automobiles or automated guided vehicles used in manufacturing. As automotive suppliers are adding more diagnostic capabilities, there is a greater need for telecommuting this information outside the local bus and, in some instances, loading critical updates to those protected services. However, in doing so, many of the critical controller edges are exposed to potential malicious outside sources. System 220 applies the secure communication security and control discussed above to those protected services on the local bus. In system 220, an authorizer 225 local to bus network 96 operates in concert with internet-based service manager 226. Authorizer 225 may be a software module integrated with a local bus hardware controller, such as a CAN bus hardware controller, which maintains target local bus protected services signatures. Like authorizer 225, a receiver 228 may be a software module integrated with the local bus hardware controller to perform the receiver functions defined above and to provide a bridge for telecommunicating to protected services 230 on the local bus.

Figure 10:
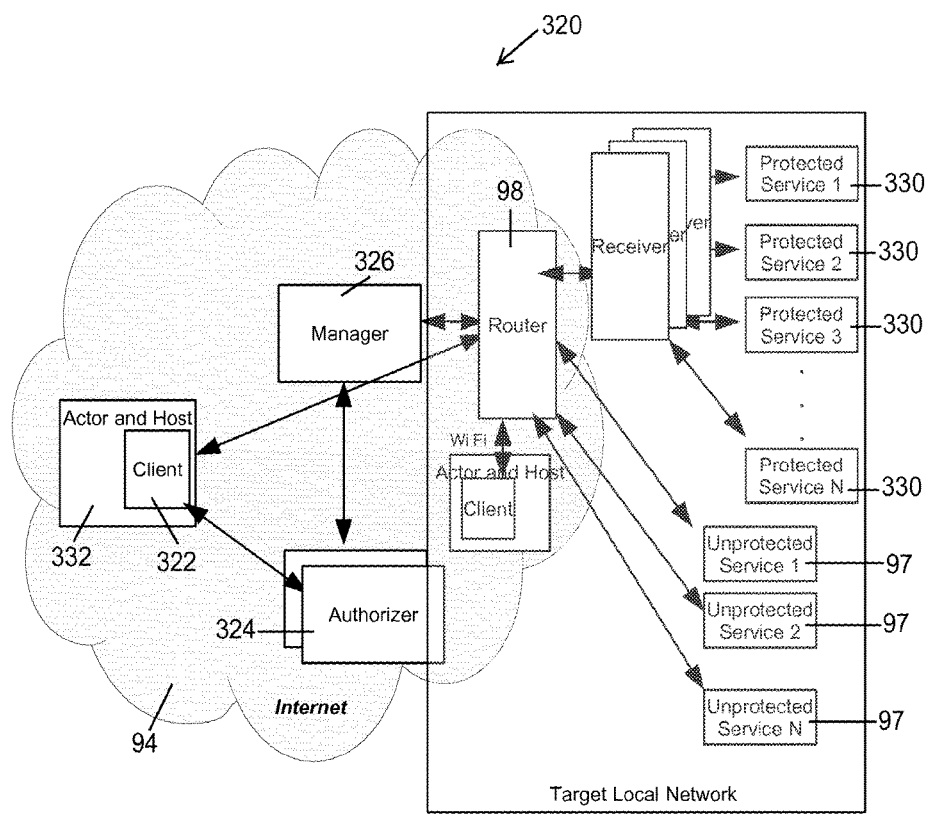
FIG. 10 is a block diagram illustrating a partially isolated embodiment of a secure communication system in accordance with the present invention.

A secure communication system 320 having a partially isolated network architecture is shown in FIG. 10. Secure communication system 320 uses the secure communication process discussed above with respect to secured communication system 20 such that a detailed description need not be repeated herein. Like components of secured communication system 320 are labeled with similar reference numerals, but with 300 added to the reference numerals of secured communication system 20. System 320 includes an actor host 332 with an associated client 322, an authorizer 324, and a service manager 326 all located in the internet 94. System 320 allows the separation of services 330 protected by the secure communication process from those traditional unprotected services 97. This is accomplished using a router or switch 98 to separate protected services 330 from unprotected services 97 and applying the secure communication process to only protected services 330.

Figure 11:
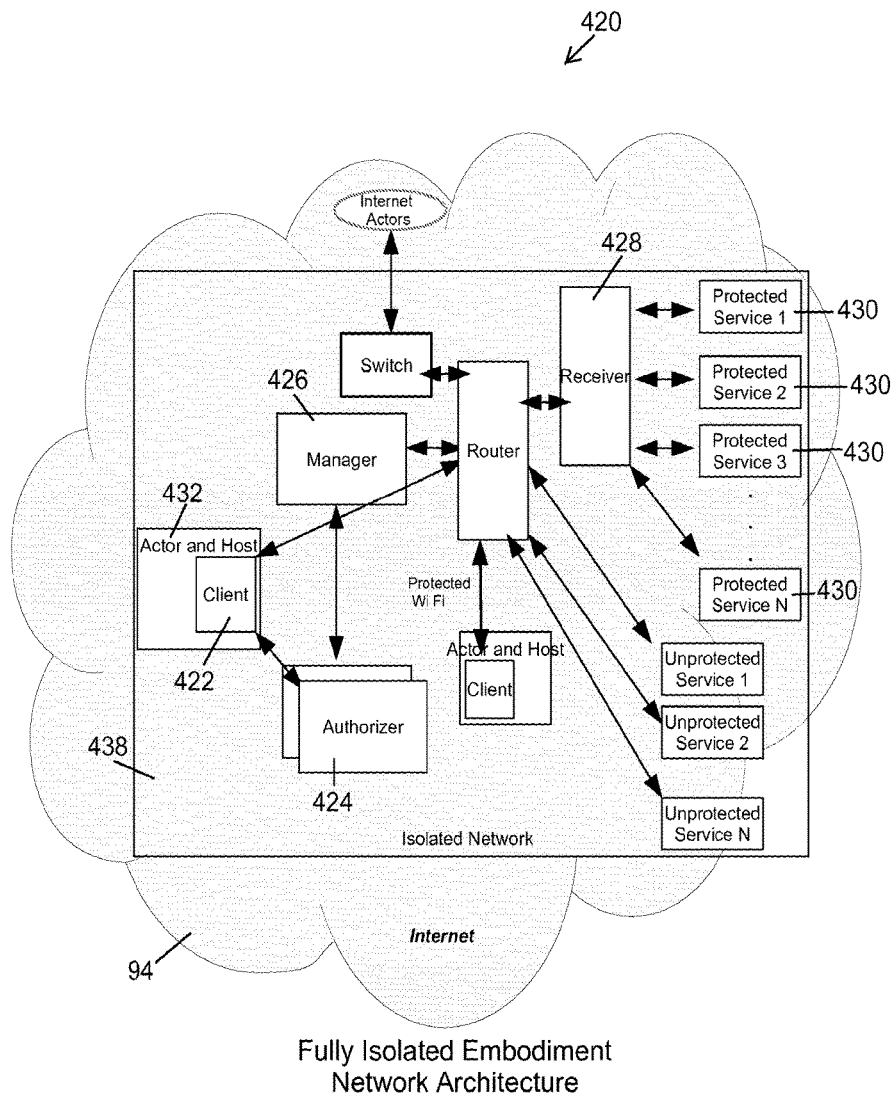
FIG. 11 is a block diagram illustrating a fully isolated embodiment of a secure communication system in accordance with the present invention.

A secure communication system 420 having a fully isolated network architecture is illustrated in FIG. 11. Secure communication system 420 uses the secure communication process described above with respect to secured communication system 20 such that a detailed discussion need not be repeated herein. System 420 includes an actor host 432 with an associated client 422, an authorizer 424, a service manager 426, and a receiver 428 all located in the internet 94. However, system 420 uses the secure communication process to logically isolate its network from all outside network traffic. The physical location of client 422, authorizer 424, service manager 426 and receiver 428 may be anywhere as long as they are part of internet 94 and have sufficient internet speed to perform their function. Unlike a Virtual Private Network that extends an entities network outside to other actors, and thereby extends the entities network limitations to the other actors, secure communication system 420 applies the secure communication processes described above both inside and outside an isolated network 438, thereby protecting critical services 430 from all outside actors and limiting inside actors 432 or services to only their authorized services. This does not limit inside actor 432 or protected service 430 from accessing internet services outside the isolated network.

Secured communication system 420 is particularly useful for entities that need to physically and logically secure authorizer 424, service manager 426 and receiver 428 such that these devices only perform secure communication functions for actor hosts 432 within isolated network 438. There would be no traffic from other entities on their logically isolated network. The loading on authorizer 424 and service manager 426 would be only their isolated loading from clients 422 in isolated network 438.

Therefore, the present invention provides secure access to computer services by authenticating the client attempting to access the service before exposing the service to the client and limiting access to only those specific services authorized for that particular client. Authentication is done without accessing the services or exposing the services to any outside person or computer. That is, the services remain dark and cannot be seen and are not accessible to any outside probes. Only after the client has been authenticated is a secure connection between the client and the service created.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A secure communication system comprising:
   a software program client operating on a host computing device, wherein said client is configured to access one or more protected services running on a computing device that is remote to said host computing device over a communication channel, and wherein said client is configured to unlock a token such that said client uses a particular user identity;
   a service manager configured to manage said access to said protected services by said client, wherein said service manager is remote to said host computing device, and wherein said service manager maintains a list of predetermined services authorized for said client and limits said access of said client to said predetermined services;
   an authorizer in communication between said client and said service manager, wherein said authorizer is operable to authenticate said client's user identity and, upon authentication, request said predetermined services authorized for said client from said service manager to relay to said client; and
   a receiver in communication with said service manager and serving as an interface to said protected services, wherein said receiver ignores connection requests from said client until a notification is received from said service manager authorizing said receiver to open a communication channel with said client, wherein access of at least one of a browser and an application of said client is limited to said predetermined services, and wherein the at least one of a browser and an application of said client communicates with said predetermined services through said receiver.

2. The secure communication system of claim 1, wherein said client is further configured to maintain a heartbeat connection with said authorizer, and wherein said authorizer sends a request to said service manager to have said receiver disconnect said communication channel with said client when said heartbeat is no longer present.

3. The secure communication system of claim 1, further including a switch or router in communication between said client and said receiver, wherein said switch or router is configured to direct data messages not intended for said protected services away from said receiver.

4. The secure communication system of claim 1, wherein communication between said client, said authorizer, said service manager and said receiver is over a network.

5. The secure communication system of claim 4, wherein said network is the Internet.

6. The secure communication system of claim 1, wherein said communication between said receiver and said protected services is over a local bus network.

7. The secure communication system of claim 6, wherein said local bus network is a local bus.

8. The secure communication system of claim 1, wherein said communication channel between said client and said receiver is secure.

9. The secure communication system of claim 1 further comprising a plurality of authorizers, wherein said receiver is remote to said computing device running said protected services.

10. The secure communication system of claim 1 further comprising a local bus network, wherein communication between said client, said authorizer, and said service manager is over the Internet, wherein said receiver and an additional authorizer are local to said local bus network, and wherein said communication between said receiver and said protected services is over said local bus network.

11. The secure communication system of claim 10, wherein said client has access to one or more unprotected services local to said local bus network without said receiver acting as an interface.

12. The secure communication system of claim 1, wherein communication between said client, said authorizer, said service manager, and said receiver is over a logically isolated network residing in the Internet, and wherein the logically isolated network is isolated from all outside network traffic.

13. An authorizer comprising:
   a communication device operable to send and receive messages over a network; and a processing device in digital communication with said communication device, wherein said processing device is enabled to:
   authenticate an access request to one or more protected services running on a remote computing device based on a user identity received through said communication device from a client operating on a remote host computing device, wherein said user identity identifies the user requesting access to said protected services, and wherein said client acquires the user identity by unlocking a token;
   request a list of available services associated with said user identity from a service manager using said communication device, wherein said service manager maintains a list of predetermined services authorized for said user identity, and wherein said service manager is remote to said host computing device; and
   return said list of predetermined services to said client using said communication device.

14. The authorizer of claim 13, wherein said processing device is further enabled to monitor a heartbeat message received periodically over said communication device from said client and report to said service manager using said communication device when said heartbeat message is no longer present.

15. The authorizer of claim 13, wherein said network is an Internet.

16. A service manager comprising:
   a communication device operable to send and receive messages over a network;
   a memory device for storing access rights to one or more protected services running on a remote computing device; and
   a processing device in digital communication with said communication device and said memory device, wherein said processing device is enabled to:
   retrieve from said memory device a list of protected services authorized for a remote client operating on a host computing system based on a user identity received through said communication device from an authorizer, and return to said authorizer said list of said protected services associated with said user identity using said communication device, wherein said user identity is acquired when said client unlocks a token, and wherein said service manager is remote to said host computing device; and validate a request received through said communication device to access said protected services based on said access rights stored in said memory device and notify a receiver of said valid request, wherein said receiver is in communication between said client and said protected services when notified of said valid session request by said service manager, and wherein said receiver ignores all attempts to communicate with said protected services until notified of said valid session request.

17. The service manager of claim 16, wherein said processing device is further enabled to track a history of connections to said protected services.

18. The service manager of claim 16, wherein said network is an internet.

19. A receiver comprising:
a communication device operable to send and receive messages over a network;
a memory; and
a processing device in communication with said communication device;
wherein said processing device is enabled to create a communication session between at least one of a browser and an application of a client operating on a host computing system and one or more protected services running on a remote computing device, and wherein said receiver is remote to said computing device running said protected services,
wherein said processing device ignores requests from said client to access said protected services until said processing device receives an authorization from a service manager through said communication device to allow a secure communication session with said client, wherein said service manager is configured to manage access to said protected services, wherein said service manager is remote to said host computing device, and wherein said communication session between the at least one of a browser and an application of said client and said protected services is through said receiver, and
wherein said processing device disconnects the secure communication session between the receiver and said client if the client fails to maintain a heartbeat with an authorizer.

20. The receiver of claim 19, wherein said network is an internet.

21. The receiver of claim 19, further comprising a local bus hardware controller for communicating with said protected services.

22. The receiver of claim 21, wherein said local bus hardware controller is a local bus hardware controller.

23. The receiver of claim 19, wherein said communication session between said receiver and at least one of a browser and an application of said client is secure.

24. A method of securely accessing protected services running on a remote computing device by a remote client operating on a host computing system, the method comprising:
transmitting a user identity over a network to an authorizer for authentication, wherein the user identity is acquired by the client unlocking a token, wherein said authorizer is in communication with a service manager configured to limit access to said protected services based on limitations established by an administrator of said protected services, wherein said service manager is remote to said client operating on said host computing system;
waiting to receive an authentication response from said authorizer over said network, wherein said authentication response includes a list of protected services authorized for said user identity;
transmitting a request to access one or more services from said list of protected services to said authorizer over said network, wherein said authorizer relays said request to said service manager, and wherein said request is verified by said service manager based on said list of protected services authorized for said user identity;
transmitting a connection request from the client over said network to a receiver, wherein said receiver is in communication with said protected services, and wherein said receiver is configured to ignore said connection request until said receiver receives a notification from said service manager that said request to access said protected services via a secure communication session has been verified;
waiting for said receiver to validate said connection request and open a communication channel; and
communicating with said service through said receiver over said communication channel.

25. The method of claim 24, further comprising transmitting a heartbeat message to said authorizer over said network to keep said communication channel open.

26. The method of claim 24, wherein said communication channel with said receiver is secured.

27. The method of claim 24, wherein said network is an internet.

28. A method of providing access to protected services running on a remote server comprising:
authenticating, with an authorizer, a client requesting access to said protected services based on a user identity received from said client, wherein said user identity identifies a host computing system running said client, and wherein said user identity is acquired by the client unlocking a token;
requesting, with the authorizer, a list of protected services authorized for said host computing system based on said user identity from a service manager; and
authorizing, with the service manager, a receiver to open a communication channel between at least one of a browser and an application of said client and said protected services through said receiver, wherein said service manager is remote to said client, wherein all communication between the at least one of a browser and an application of said client and said protected services is through said receiver, and wherein said access of the at least one of a browser and an application of said client to said protected services is limited to protected services authorized for said host computing system.

29. The method of claim 28, further comprising monitoring a heartbeat message received from said client and closing said communication channel if said heartbeat message is no longer received.

30. The method of claim 28, wherein said communication channel between said client and said receiver is secure.

* * * * *